(12) United States Patent
Tobita (10) Patent No.: US 10,302,896 B2
(45) Date of Patent: May 28, 2019

(54) OPTICAL PART, METHOD OF MANUFACTURING THE OPTICAL PART, AND CAMERA

(71) Applicant: CANON KABUSHIKI KAISHA, Tokyo (JP)

(72) Inventor: Shusuke Tobita, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/213,005

(22) Filed: Jul. 18, 2016

(65) Prior Publication Data

US 2017/0023762 A1 Jan. 26, 2017

(30) Foreign Application Priority Data

Jul. 22, 2015 (JP) ................. 2015-145133

(51) Int. Cl.
| | | |
|---|---|---|
| *G02B 7/02* | (2006.01) | |
| *G02B 25/00* | (2006.01) | |
| *G02B 27/00* | (2006.01) | |
| *B29D 11/00* | (2006.01) | |
| B29C 45/14 | (2006.01) | |
| B29K 669/00 | (2006.01) | |
| B29K 23/00 | (2006.01) | |
| B29L 11/00 | (2006.01) | |

(52) U.S. Cl.
CPC ........ *G02B 7/022* (2013.01); *B29D 11/00432* (2013.01); *G02B 25/001* (2013.01); *G02B 27/0018* (2013.01); B29C 45/14311 (2013.01); B29K 2023/38 (2013.01); B29K 2669/00 (2013.01); B29L 2011/0016 (2013.01)

(58) Field of Classification Search
CPC .... G02B 7/022; G02B 25/001; G02B 25/002; G02B 25/007; G02B 27/0018; G02B 23/16; G03B 11/04
USPC .......... 359/613, 611, 811, 819, 830; 264/1.7
See application file for complete search history.

(56) References Cited

U.S. PATENT DOCUMENTS

| | | | | |
|---|---|---|---|---|
| 5,973,862 A | * | 10/1999 | Hashizume | .......... G02B 6/4292 257/E31.117 |
| 2001/0040737 A1 | | 11/2001 | Nakano et al. | |
| 2013/0176633 A1 | * | 7/2013 | Sun | .......... G02B 7/02 359/811 |

FOREIGN PATENT DOCUMENTS

| | | |
|---|---|---|
| CN | 1460874 A | 12/2003 |
| CN | 1719297 A | 1/2006 |
| CN | 1721901 A | 1/2006 |
| CN | 101846782 A | 9/2010 |
| CN | 101879765 A | 11/2010 |
| CN | 103827049 A | 5/2014 |
| CN | 104142552 A | 11/2014 |
| JP | S61-045730 U | 3/1986 |
| JP | H08254643 A | 10/1996 |
| JP | 2000214368 A | 8/2000 |
| JP | 2000292672 A | 10/2000 |
| JP | 2001033677 A | 2/2001 |
| JP | 2001174682 A | 6/2001 |

(Continued)

*Primary Examiner* — Marin Pichler
(74) *Attorney, Agent, or Firm* — Canon U.S.A., Inc. IP Division (57) ABSTRACT

An optical part includes a lens and a holder having the lens fixed thereto. The holder is a cylindrical member including a front surface, a back surface, an outer peripheral surface, and an inner peripheral surface. The back surface contacts the lens, and part of the inner peripheral surface penetrates the lens.

6 Claims, 8 Drawing Sheets

(56) References Cited

FOREIGN PATENT DOCUMENTS

| JP | 2001208947 | A | 8/2001 |
|----|------------|---|--------|
| JP | 2001350074 | A | 12/2001 |
| JP | 2002014267 | A | 1/2002 |
| JP | 2002072037 | A | 3/2002 |
| JP | 2002148501 | A | 5/2002 |
| JP | 2002189160 | A | 7/2002 |
| JP | 2003029116 | A | 1/2003 |
| JP | 2003295025 | A | 10/2003 |
| JP | 2003307668 | A | 10/2003 |
| JP | 2005084328 | A | 3/2005 |
| JP | 2011237471 | A | 11/2011 |
| JP | 2014238573 | A | 12/2014 |
| TW | 437102 | B | 5/2001 |

\* cited by examiner

OPTICAL PART, METHOD OF MANUFACTURING THE OPTICAL PART, AND CAMERA

BACKGROUND OF THE INVENTION

Field of the Invention

The present invention relates to an optical part and a method of manufacturing the optical part. More particularly, the present invention relates to, for example, an optical part that is a lens with a holder, used in a finder of a digital single lens reflex camera; and a method of manufacturing the optical part.

Description of the Related Art

Resin lenses have many uses, such as being used as a photographing lens of a digital camera, a recording/reproducing pickup lens of an optical disk, and a projection lens of a projector. To reduce costs, many of these resin lenses are manufactured by injection molding. To install such resin lenses as parts in a product and make them function, such lenses are placed in a frame-shaped lens holder and integrated therewith in a back end process. Although the lens holder is also called a lens barrel, the lens holder is consistently called a holder in the present invention. The holder functions as a part that allows a resin lens to be easily installed in a camera, functions as a driving part that moves the resin lens, and functions to intercept light (functions as a mask) to suppress the occurrence of ghosts caused by reflection of light by a side surface of the lens.

To fix the lens to and integrate the lens with the holder, an adhesive is generally used. However, the cost of the back end process of fixing the lens to and integrating the lens with the holder with an adhesive is high. A method of molding a lens by, with an undercut being formed in an inner periphery of the holder and the holder being inserted in a mold, pouring molten resin therein is also used. With the undercut being formed in the holder, the molten resin flows around the undercut. When the molten resin is solidified in this state, while the lens is firmly fixed to and integrated with the holder, an optical part that is the lens with the holder can be taken out from the mold.

According to Japanese Patent Laid-Open No. 2002-148501 (Patent Literature (PTL) 1), a light-intercepting section (a mask section) is formed in addition to forming an undercut section for fixing a lens in an inner periphery of a resin holder. PTL 1 describes the molding of a resin lens with the resin holder being inserted in a mold.

Figure 8:
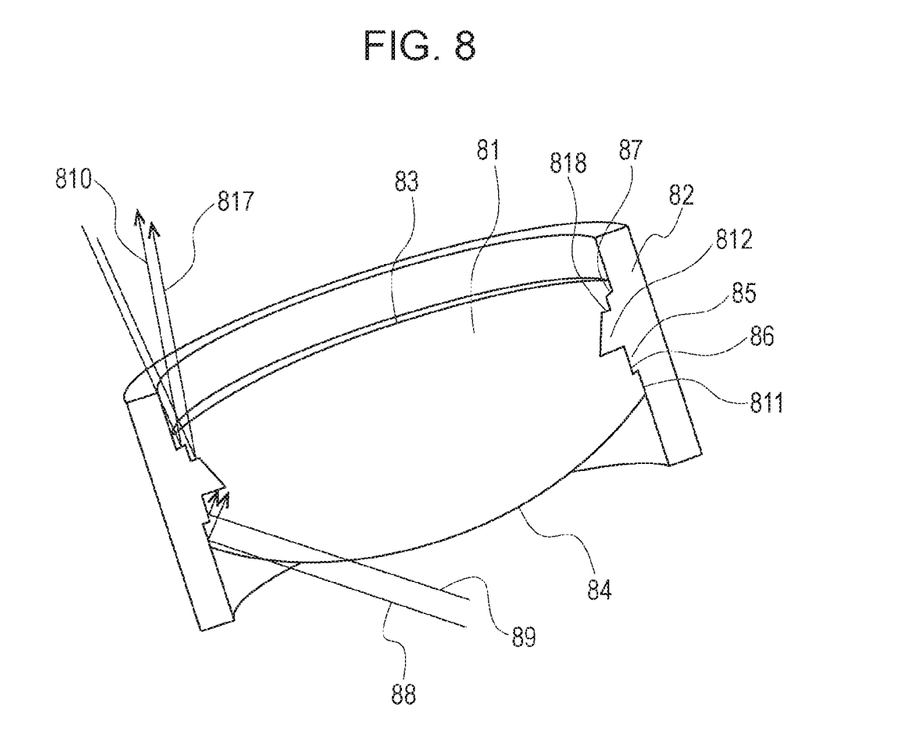
FIG. 8 illustrates a related art.

FIG. 8 is a figure for describing PTL 1 and is a sectional view of the lens with the holder described in PTL 1. The sectional view is a view formed by cutting the lens with the holder by a parallel plane that includes an optical axis of the lens and that is parallel to the optical axis. In FIG. 8, the entire region of a side surface 811 of a resin lens 81 is surrounded by a resin holder 82. An undercut section 85 and a light-intercepting section (a mask section) 812 exist in the inner periphery of the resin holder 82. When a lens material flows around the undercut section 85 and the light-intercepting section 812 and is solidified, the undercut section 85 and the light-intercepting section (the mask section) 812 penetrate the side surface 811 of the lens. By causing the holder 82 to penetrate the lens in the direction of the optical axis of the lens, the holder is fixed to the lens.

When reference numeral 83 denotes an eyepiece-side lens surface and reference numeral 84 denotes an objective-side lens surface, a reflection light beam 88 that is incident from the objective-side lens surface 84 and that is reflected at the lens side surface 811 is intercepted by the light-intercepting section (the mask section) 812, and, thus, does not reach the eyepiece-side lens surface 83. Similarly, a reflection light beam 89 that is incident from the objective-side lens surface 84 and that is reflected at a side surface 86 of the undercut section 85 is also intercepted by the light-intercepting section (the mask section) 812 and, thus, does not reach the eyepiece-side lens surface 83.

However, a reflection light beam 810 that is incident from the eyepiece-side lens surface 83, that is visually recognized when seen from the eyepiece-side lens surface 83, and that is reflected at a front surface 87 of the undercut section 85 is transmitted through the eyepiece-side lens surface 83 and travels back to an eye side. Therefore, the reflection light beam 810 is visually recognized as a ghost. Similarly, since the resin of the lens flows around the entire mask 812, a reflection light beam 817 that is incident from the eyepiece-side lens surface, that is visually recognized when seen from the eyepiece side, and that is reflected at a planar section 818 of the mask 812 is generated. The reflection light beam 817 is also visually recognized as a ghost because the reflection light beam 817 is also transmitted through the eyepiece-side lens surface 83 and travels back to the eye side.

When a lens is molded out of molten resin with the holder inserted in the mold, the eyepiece-side lens surface 83 and the objective-side lens surface 84 are cooled while they are in contact with a mold surface, whereas the lens side surface 811 is cooled while in contact with the holder 82. Since the holder 82 is made of resin, the holder 82 has a thermal conductivity that is lower than that of metal. This hampers heat exchange from the lens side surface in the cooling process. Since the heat exchange of the entire lens is not uniform, a mold mirror surface cannot be transferred with high precision.

Further, since it is necessary to insert and hold the holder 82 in the mold, the holder 82 needs to be larger than the external shape of the lens. Therefore, the optical part becomes large.

As described above, hitherto, in manufacturing a lens with a holder, there has been a demand for reducing the size of an optical part, reducing the occurrence of ghosts, and increasing the precision of lens surfaces.

SUMMARY OF THE INVENTION

According to an aspect of the present invention, there is provided an optical part including a lens and a holder having the lens fixed thereto. The holder is a cylindrical member including a front surface, a back surface, an outer peripheral surface, and an inner peripheral surface. The back surface contacts the lens, and part of the inner peripheral surface penetrates the lens.

According to another aspect of the present invention, there is provided a camera including the optical part.

According to still another aspect of the present invention, there is provided a method of manufacturing an optical part including: with a front surface and an outer peripheral surface of a cylindrical holder that includes the front surface, a back surface, the outer peripheral surface, and an inner peripheral surface being in contact with a mold part, injecting molten resin into a cavity of a mold; and, with only the back surface and part of the inner peripheral surface being in contact with the molten resin, cooling the molten resin to manufacture the optical part including a lens that is fixed to the holder.

The present invention makes it possible to provide an optical part that is small in size and that reduces the occurrence of ghosts.

Further features of the present invention will become apparent from the following description of exemplary embodiments with reference to the attached drawings.

DESCRIPTION OF THE EMBODIMENTS

Figure 1A:
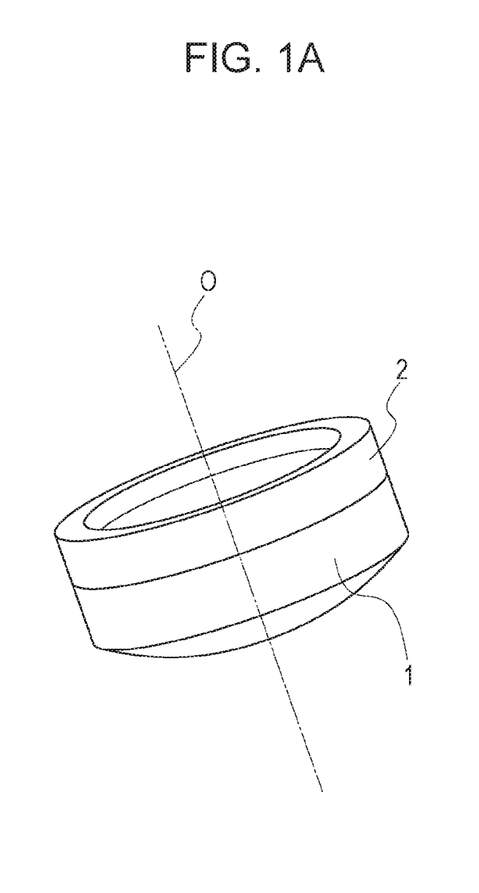
FIGS. 1A and 1B illustrate an optical part according to an exemplary embodiment.
Figure 1B:
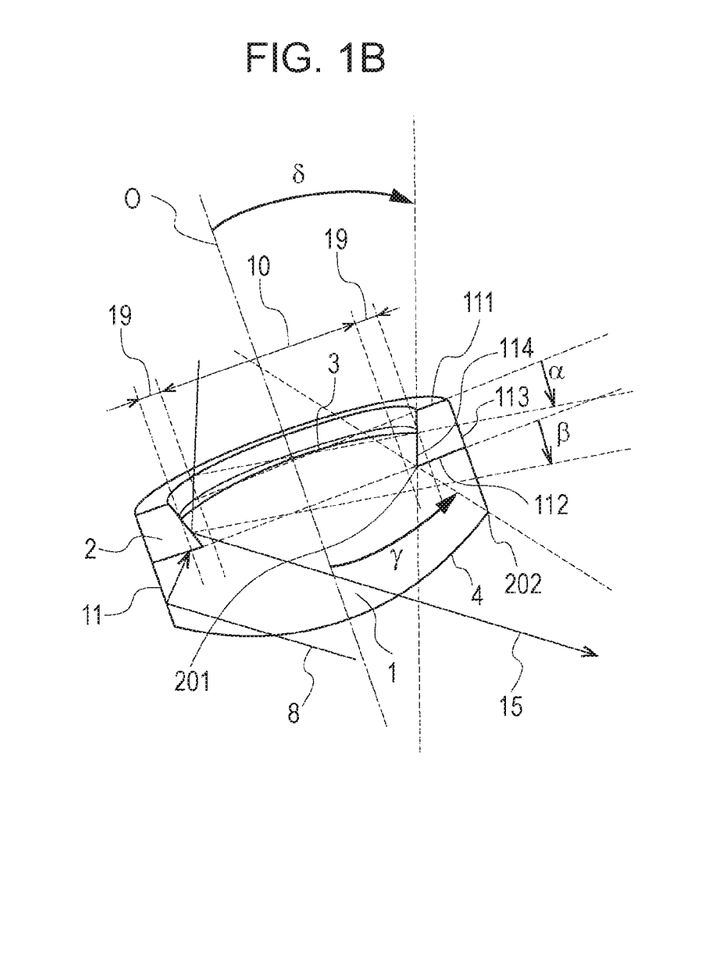

FIGS. 1A and 1B illustrate a lens with a holder, which is an optical part according to the present invention. FIG. 1A is a bird's eye view of the lens with the holder, which is the optical part according to the exemplary embodiment. FIG. 1B is a sectional view of the lens with the holder, which is the optical part according to the exemplary embodiment. This sectional view is formed by cutting the optical part by a parallel plane that includes an optical axis of the lens and that is parallel to the optical axis. Reference numeral 1 denotes the lens. An eyepiece is used as an example of the lens 1 according to the exemplary embodiment. Reference numeral 3 denotes an eyepiece-side lens surface, reference numeral 4 denotes an objective-side lens surface, and reference numeral 11 denotes a side surface of the lens.

Reference numeral 2 denotes the holder. The holder 2 is a cylindrical member that includes a front surface 111, a back surface 112, an outer peripheral surface 113, and an inner peripheral surface 114, and that is disposed adjacent to an outer peripheral portion of one of the surfaces of the lens (non-optical effective region 19). The back surface 112 and part of the inner peripheral surface 114 contact the lens. More specifically, when the lens is an eyepiece, the back surface 112 of the holder and the non-optical effective region 19 of the eyepiece-side lens surface 3 of the lens 1 contact each other, and at least part of the inner peripheral surface 114 of the holder penetrates the eyepiece-side lens surface 3, so that such part of the inner peripheral surface 114 contacts the lens. This causes the holder 2 to be adjacent to and fixed to the lens 1 at a side of the eyepiece-side lens surface 3, and the eyepiece-side lens surface 3 to be surrounded by the inner peripheral surface 114.

In the exemplary embodiment, an example of the front surface 111 of the holder 2 is a surface extending in a direction that is perpendicular to an optical axis O of the lens. However, the front surface 111 of the holder 2 may be a surface that is inclined by an angle in the range of 0 degrees to 70 degrees with respect to a plane extending in a direction that is perpendicular to the optical axis O of the lens. That is, it is desirable that an angle α shown in FIG. 1B be in the range of 0 degrees to 70 degrees. As the angle α, angles that are greater than or equal to 0 degrees are desirable because a reflection light beam can be reflected to an outer portion of the lens. However, if the angle α exceeds 70 degrees, the holder becomes thinner, as a result of which its strength may become low.

In the exemplary embodiment, an example of the back surface 112 of the holder 2 is a surface extending in a direction that is perpendicular to the optical axis O of the lens. However, the back surface 112 of the holder 2 may be a surface that is inclined with respect to a plane extending in a direction that is perpendicular to the optical axis O of the lens. It is desirable that an angle (an angle β in FIG. 1B) be in the range of 0 degrees to 90 degrees with respect to the plane extending in the direction that is perpendicular to the optical axis O of the lens. If the angle β is less than 0 degrees (in the direction towards the inner peripheral surface 114), since the distance to the inner peripheral surface 114 is reduced, the holder becomes thin-walled, as a result of which its strength may become low. In addition, resin may not easily enter the mold when molding the holder. If the angle β exceeds 90 degrees, a light beam is reflected to an inner side of the lens, as a result of which a ghost may occur. It is desirable that an angle formed by an intersection line of the back surface 112 and the parallel plane that includes the optical axis of the lens and that is parallel to the optical axis of the lens, and an intersection line of the parallel plane and the inner peripheral surface 114 be an acute angle. If this angle is not an acute angle, a force for holding the lens is weak, as a result of which the lens may fall off from the holder. A ridge line where the back surface 112 and the inner peripheral surface 114 (described later) intersect each other may be chamfered. When the ridge line is chamfered, it is desirable that a plane width (distance between the back surface 112 and the inner peripheral surface 114) be less than 1 mm. If the width is greater than or equal to 1 mm, ghosts may occur.

Although, in the exemplary embodiment, an example of the outer peripheral surface 113 of the holder 2 is a surface extending in a direction parallel to the optical axis of the lens, the outer peripheral surface 113 is not limited thereto, and, thus, may be inclined.

The inner peripheral surface 114 of the holder 2 is a surface that is adjacent to the back surface 112. It is desirable that the inner peripheral surface 114 be inclined at an angle δ in the range of 10 degrees to 70 degrees with respect to the parallel plane that includes the optical axis O of the lens and that is parallel to the optical axis O of the lens. It is desirable that an angle formed by the intersection line of the back surface 112 and the parallel plane that includes the optical axis of the lens and that is parallel to the optical axis of the lens, and the intersection line of the parallel plane and the inner peripheral surface 114 be an acute angle (less than 90 degrees). If this angle is not an acute angle, a force for holding the lens is weak, as a result of which the lens may fall off from the holder.

It is desirable that an angle γ formed by the optical axis O of the lens and a line connecting an intersection point 201 of the inner peripheral surface 114 and the back surface 112 and a ridge line 202 at an end portion of the objective-side lens surface (that is, an angle formed between the optical axis and a straight line that connects a mask edge and an eyepiece-side lens end portion) be greater than or equal to 10 degrees. Reference numeral 201 denotes the intersection point where the intersection line of the back surface and the parallel plane that includes the optical axis of the lens and that is parallel to the optical axis of the lens intersects the intersection line of the parallel plane and the inner peripheral surface. Reference numeral 202 denotes a point that is closest to the intersection point 201 in the parallel plane that includes the optical axis of the lens at the eyepiece-side lens end portion. That is, the angle γ is an angle formed by the optical axis of the lens and a straight line connecting the intersection point 201 and the point 202. This angle γ is desirably greater than or equal to 10 degrees. If the angle γ is less than 10 degrees, ghosts may become noticeable.

Although it is desirable that the holder 2 be made of resin having a light-intercepting function, the holder 2 is not limited thereto. The holder 2 may be made of, for example, a metal having a light-intercepting function. It is desirable that the resin having a light-intercepting function be, for example, black polycarbonate containing a glass filler in the range of 10 wt % to 20 wt % of the entire weight of the holder. However, the resin is not limited thereto. If the wt % is less than 10 wt %, the holder 2 may not have sufficient strength. If the wt % is greater than 20 wt %, the moldability is reduced, as a result of which the front surface may become uneven. In order to make the holder 2 black, a dye may be added to the polycarbonate. Although resins containing polycarbonate that contains ABC, resins containing ABS, resins containing PS, or resins containing PMMA may be used, it is more desirable to use resins containing polycarbonate. This is because polycarbonate has high TG and does not dissolve readily.

Although it is desirable that the lens 1 be made of resin, the lens 1 is not limited thereto. The lens 1 may be made of, for example, glass. Although the resin used in the lens is desirably cyclo-olefin polymer, any material may be used as long as the material has low miscibility with respect to the holder. If the resin is miscible with the holder, the holder tends to be deformed due to a linear expansion difference, a thermal contraction difference, and a moisture absorption difference. In addition to cyclo-olefin polymer, any type of resin may be used as long as the resin is a non-polar resin, which is exemplified by an olefin-based resin.

Due to manufacturing reasons, the non-optical effective region 19 exists in an outer peripheral portion of an optical effective region in almost all lenses. If part of the inner peripheral surface 114 of the holder 2 penetrates the non-optical effective region 19, and the back surface 112 and such part of the inner peripheral surface are brought into contact with the lens, the lens 1 can be fixed to the holder 2. By virtue of this structure, it is not necessary to join the holder and the side surface 11 of the lens as it is in the related art. Therefore, it is possible to dispose the outer peripheral surface 113 of the holder continuously with an extension plane of the side surface of the lens, and continuously form the side surface 11 of the lens and the outer peripheral surface 113 of the holder flush with each other. Consequently, the external dimensions of the optical part can be equivalent to the external dimensions of the lens 1 even if the lens 1 is provided with the holder, so that the size of the optical component can be reduced.

When the holder 2 cannot penetrate the non-optical effective region 19 by a necessary amount in terms of optical design, it is necessary to enlarge the non-optical effective region 19. However, depending upon the adhesive strength required for the lens and the holder, a very small enlargement amount of 1 mm or less is sufficient. It is possible to integrate the lens 1 and the holder 2 with each other almost without enlarging the external shape of the lens.

A reflection light beam 8 that is incident from the objective-side lens surface 4 and that is reflected by the lens side surface 11 is intercepted by the back surface 112 of the holder 2 and, thus, does not reach the eyepiece side. The inner peripheral surface 114 that penetrates the lens can be visually recognized when viewed from the eyepiece side. However, since the inner peripheral surface 114 is inclined with respect to the optical axis, a light beam 15 that is incident from the eyepiece-side lens surface 3 and that is reflected by the inner peripheral surface 114 does not return to the side of the eyepiece-side lens surface 3. Since a main reflection light beam does not return to the eyepiece-side lens surface 3, the frequency with which ghosts occur is considerably smaller than the frequency with which ghosts occur in the related art.

In the optical part, which is the lens with the holder, according to the present invention, since the inner peripheral surface 114 of the holder 2 is used as an undercut section, the holder 2 need not be additionally shaped for integrating the lens 1 and the holder 2. Since the inner side of the eyepiece-side lens surface 3 of the lens 1 does not have a surface (light-intercepting section) extending in a direction that is perpendicular to an optical axis of the holder for intercepting the light beam reflected at the lens side surface, a new ghost generating source is not provided. By causing part of the holder to penetrate part of the non-optical effective region of the lens surface instead of causing part of the holder to penetrate the lens side surface, it is not necessary to make the size of the external shape of the holder larger than the size of the external shape of the lens. Therefore, it is possible to reduce the size of the optical part.

Next, a method of manufacturing the optical part according to the exemplary embodiment is described.

In order to manufacture the optical part, which is the lens with the holder, according to the embodiment, with the holder inserted in the mold, a resin for the lens is injected, and the resin flows around part (the inner peripheral surface 114) of the holder to provide the holder with an undercut and a light-intercepting function.

Figure 2:
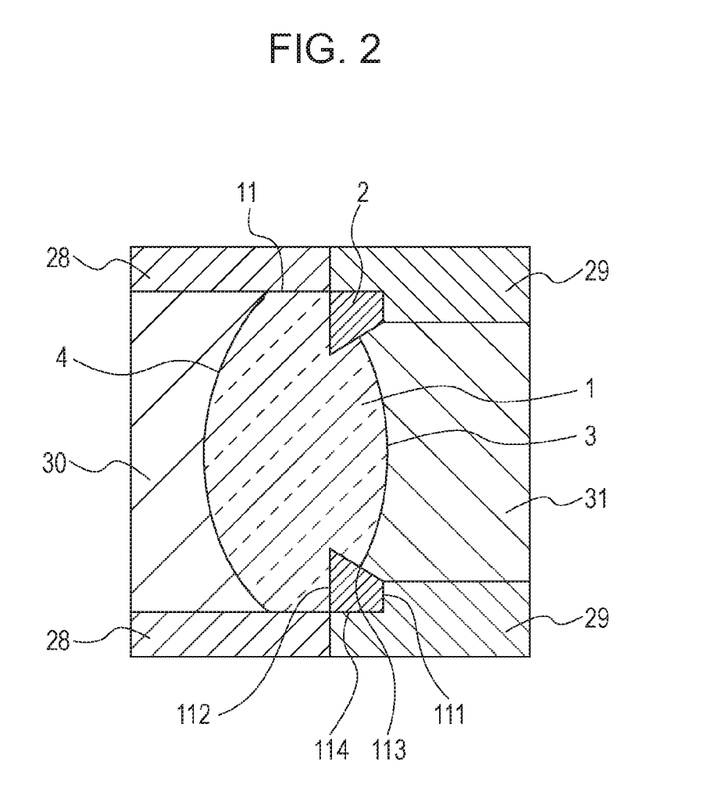
FIG. 2 illustrates a mold used in a method of manufacturing the optical part according to the exemplary embodiment.

FIG. 2 is a sectional view of the inside of the mold when molding the lens. FIG. 2 shows a state in which, with the holder 2 inserted in the mold, molten resin, which is a material of the lens, is injected into a cavity and the filling of the cavity with the molten resin is completed. An overall structure of the mold and a gate, and an injecting molding machine are those used in publicly known technologies, and are, thus, not described below.

Reference numeral 31 denotes a mold part that transfers the eyepiece-side lens surface. Reference numeral 30 denotes a mold part that transfers the objective-side lens surface. Reference numeral 29 denotes a mold part that accommodates the mold part 31. Reference numeral 28 denotes a mold part that accommodates the mold part 30. The mold part 28 that accommodates the mold part 30 has a shape that allows the side surface of the lens to be transferred. The cavity is defined by the mold part 28 that accommodates the mold part 30, the mold part 31 that transfers the eyepiece-side lens surface, the mold part 30 that transfers the objective-side lens surface, the back surface of the holder, and part of the inner peripheral surface of the holder.

The molten resin, which is a material of the lens, that has been injected into the cavity and that has filled the cavity adheres to the inserted holder in the cavity, is subjected to a cooling process, and is taken out from the mold.

In the cooling process, the eyepiece-side lens surface 3 is in contact with the mold part 31 that transfers the eyepiece-side lens surface, and the objective-side lens surface 4 is in contact with the mold part 30 that transfers the objective-side lens surface. The lens side surface 11 is also in contact with the mold part 28 that accommodates the mold part 30 that transfers the objective-side lens surface. The holder 2 is made of resin. Though the thermal conductivity of the holder 2 is lower than that of metal, the holder 2 is inserted into locations situated towards the eyepiece-side lens surface. This makes it possible to cool the lens side surface 11 while in contact with the mold part 28 instead of with the holder 2. Therefore, the insertion of the holder has little influence on heat exchange of the entire lens, so that a mold lens mirror surface can be transferred with high precision. That is, since the entire optical surface of the lens and a large portion of the side surface can be molded while they are in contact with a metallic portion of the mold, it is possible to uniformly cool the entire lens and, thus, to transfer the shape with high precision.

When inserting the holder 2 in the mold, the front surface 111 and the outer peripheral surface 113 of the holder only need to be directly held by the mold part 29. Therefore, it is not necessary to provide a special holding mechanism. As a result, it is possible to also simplify the structure of the mold.

EXAMPLES

Next, examples are described. The optical part (the lens with the holder) obtained in the exemplary embodiment, and the method of manufacturing the optical part are described with reference to FIGS. 3 to 4B.

Figure 3:
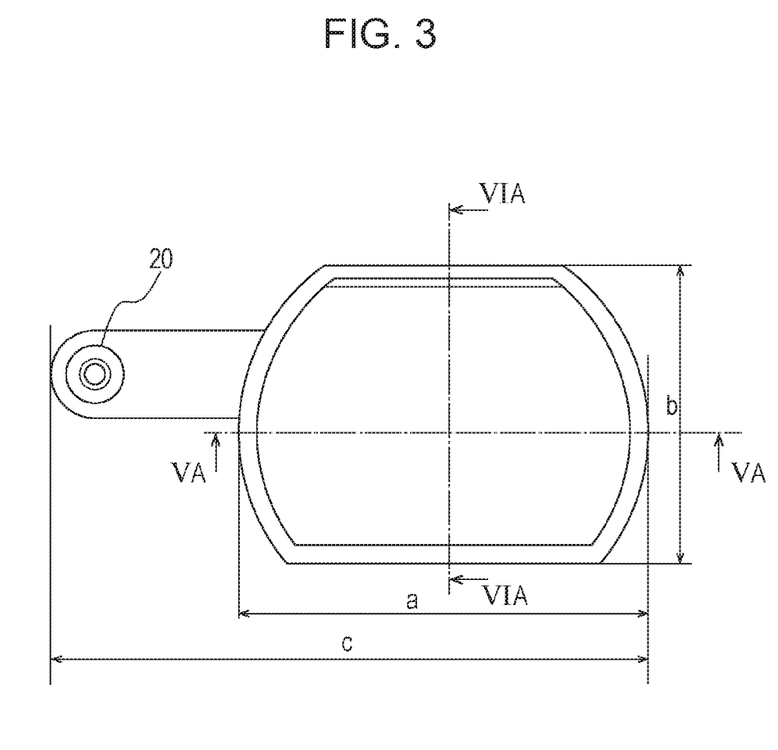
FIG. 3 illustrates the exemplary embodiment.
Figure 4A:
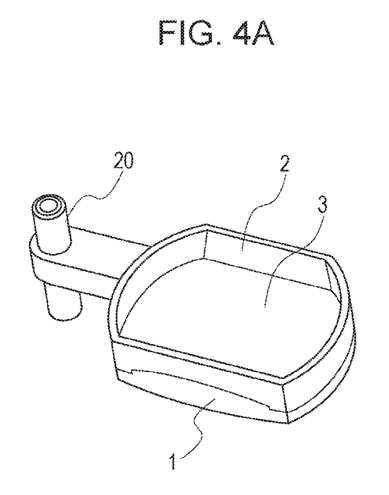
FIGS. 4A and 4B illustrate the exemplary embodiment.
Figure 4B:
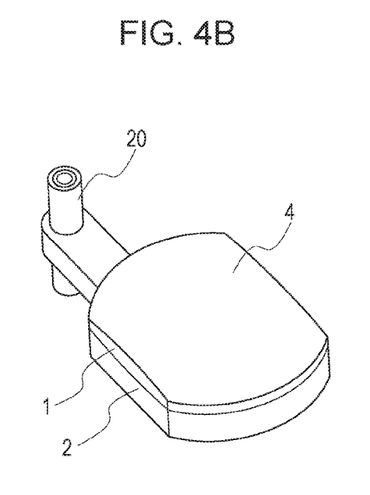

FIG. 3 is a schematic view of the optical part manufactured in the exemplary embodiment. FIG. 4A is a bird's eye view of the optical part when seen from the side of the eyepiece-side lens surface 3. FIG. 4B is a bird's eye view of the optical part when seen from a side of the objective-side lens surface 4. Reference numeral 1 denotes the lens, and reference numeral 2 denotes the holder. The lens 1 is, for example, a lens of a finder of a digital single lens reflex camera. The lens 1 used as an eyesight adjusting lens was manufactured. The holder 2 to which a sleeve section 20 was connected was manufactured. A core was inserted into the sleeve, and was installed in a camera so as to be slidable in the optical axis direction. The size of the holder was such that a short-side size d=15.3 mm, and a long-side size a=21.06 mm. The material of the lens was cyclo-olefin polymer, and the material of the holder was black polycarbonate containing 20% glass filler. Reference numeral 3 denotes the eyepiece-side lens surface that is a spherical surface. Reference numeral 4 denotes the objective-side lens surface that is an aspherical surface. Accordingly, the lens was formed as a biconvex lens. The maximum thickness of the lens was 4.46 mm.

Figure 5A:
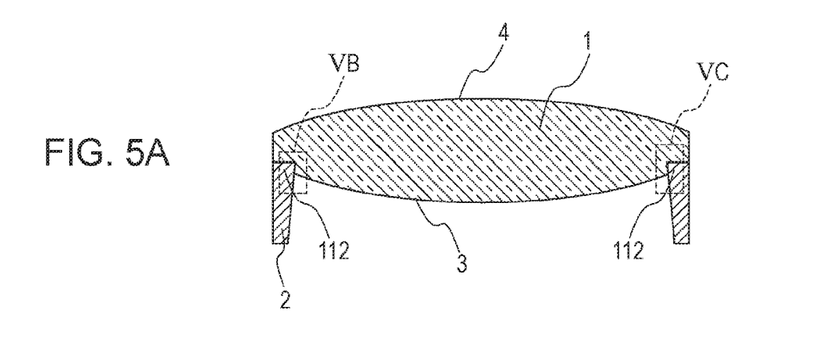
FIGS. 5A to 5C illustrate the exemplary embodiment.
Figure 5B:
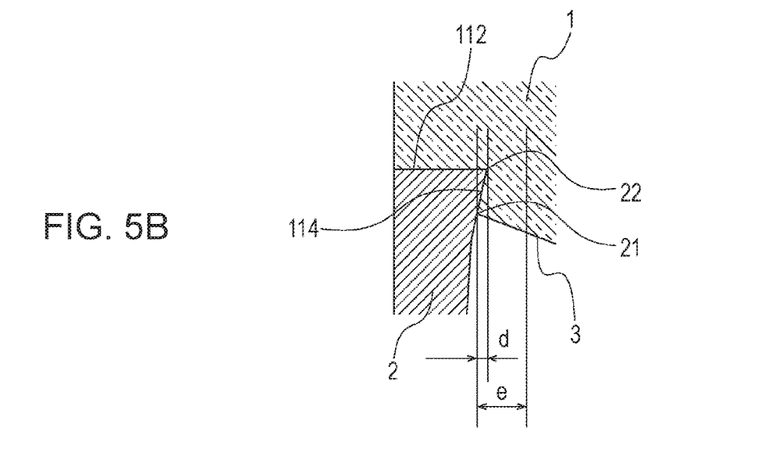
Figure 5C:
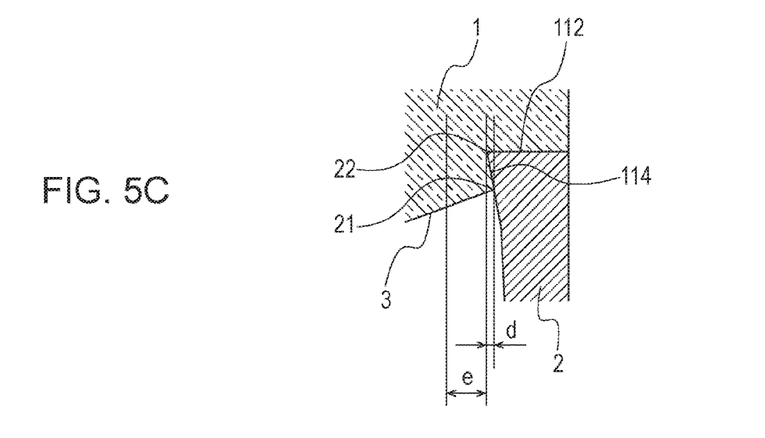

FIG. 5A is a sectional view taken along line VA-VA in FIG. 3. FIG. 5B is an enlarged view of a portion VB shown in FIG. 5A. FIG. 5C is an enlarged view of a portion VC shown in FIG. 5A.

As shown in FIG. 5B, a distance d between a line including a lens end 21 (where the eyepiece-side lens surface 3 at the portion VB and the inner peripheral surface 114 of the holder intersected each other) and being parallel to the optical axis of the lens and a line including a leading edge 22 (where the inner peripheral surface 114 and the back surface 112 of the holder intersected each other) and being parallel to the optical axis of the lens was determined. The distance d was equal to 0.138 mm. By causing the holder to penetrate the lens towards the inner side of the lens (in the optical axis direction of the lens) by an amount corresponding to the distance d, the holder could be firmly fixed to the lens without falling off from the lens. The angle (the angle γ shown in FIG. 1B) formed by the optical axis and the straight line connecting the mask edge and the eyepiece-side lens end portion was 44.17 degrees. The non-optical effective region was disposed at e=0.4 mm towards the inner side in a direction parallel to the optical axis of the lens from the lens end 21. The penetration was within the non-optical effective region.

The portion VC shown in FIG. 5C was also similar to the portion VB. More specifically, a distance d between a line including a lens end 21 (where the eyepiece-side lens surface 3 at the portion VC and the inner peripheral surface 114 of the holder intersected each other) and being parallel to the optical axis of the lens and a line including a leading edge 22 (where the inner peripheral surface 114 and the back surface 112 of the holder intersected each other) and being parallel to the optical axis of the lens was determined. The distance d was equal to 0.138 mm. By causing the holder to penetrate the lens towards the inner side of the lens by an amount corresponding to the distance d, the holder could be firmly fixed to the lens without falling off from the lens. The angle (the angle γ shown in FIG. 1B) formed by the optical axis and the straight line connecting the mask edge and the eyepiece-side lens end portion was 44.17 degrees. The non-optical effective region was disposed at e=0.4 mm towards the inner side in a direction parallel to the optical axis of the lens from the lens end 21. The penetration was within the non-optical effective region.

Figure 6A:
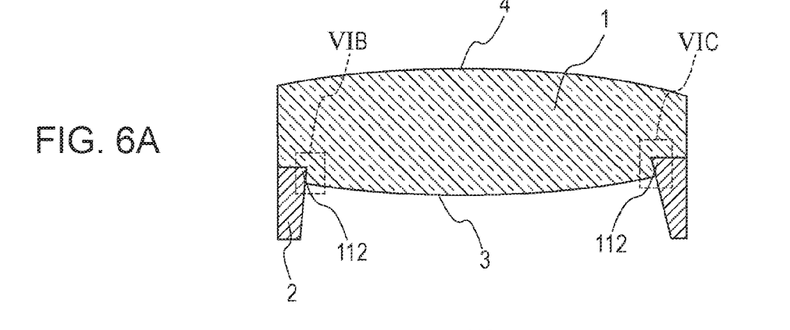
FIGS. 6A to 6C illustrate the exemplary embodiment.
Figure 6B:
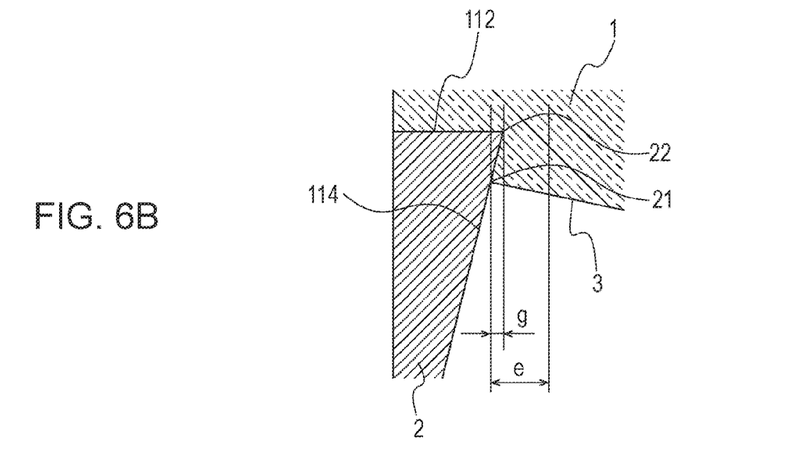
Figure 6C:
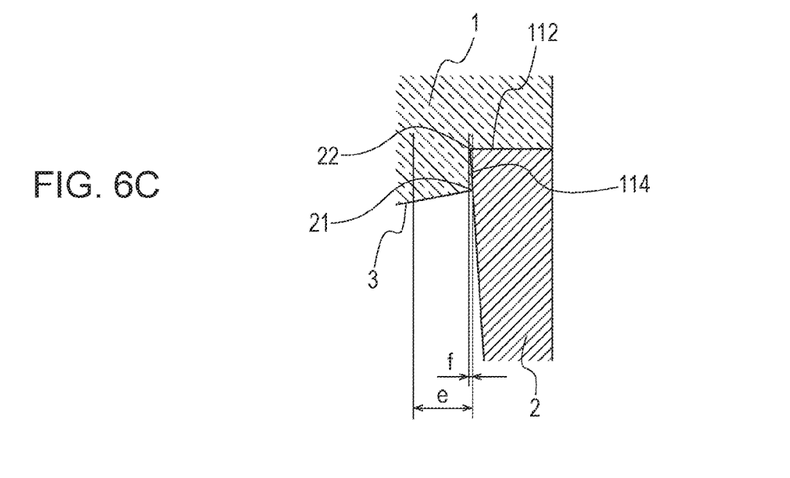

FIG. 6A is a sectional view taken along line VIA-VIA in FIG. 3. FIG. 6B is an enlarged view of a portion VIB shown in FIG. 6A. FIG. 6C is an enlarged view of a portion VIC shown in FIG. 6A.

As shown in FIG. 6B, a distance g between a line including a lens end 21 (where the eyepiece-side lens surface 3 at the portion VIB and the inner peripheral surface 114 of the holder intersected each other) and being parallel to the optical axis of the lens and a line including a leading edge 22 (where the inner peripheral surface 114 and the back surface 112 of the holder intersected each other) and being parallel to the optical axis of the lens was determined. The distance g was equal to 0.142 mm. By causing the holder to penetrate the lens towards the inner side of the lens (in the optical axis direction of the lens) by an amount corresponding to the distance g, the holder could be firmly fixed to the lens without falling off from the lens. The angle (the angle γ shown in FIG. 1B) formed by the optical axis and the straight line connecting the mask edge and the eyepiece-side lens end portion was 19.64 degrees. The non-optical effective region was disposed at e=0.4 mm towards the inner side in a direction parallel to the optical axis of the lens from the lens end 21. The penetration was within the non-optical effective region.

The portion VIC shown in FIG. 6C was also similar to the portion VIB. More specifically, a distance f between a line including a lens end 21 (where the eyepiece-side lens surface 3 at the portion VIC and the inner peripheral surface 114 of the holder intersected each other) and being parallel to the optical axis of the lens and a line including a leading edge 22 (where the inner peripheral surface 114 and the back surface 112 of the holder intersected each other) and being parallel to the optical axis of the lens was determined. The distance f was equal to 0.038 mm. By causing the holder to penetrate the lens towards the inner side of lens by an amount corresponding to the distance f, the holder could be firmly fixed to the lens without falling off from the lens. The angle (the angle γ shown in FIG. 1B) formed by the optical axis and the straight line connecting the mask edge and the eyepiece-side lens end portion was 32.78 degrees. The non-optical effective region was disposed at e=0.4 mm towards the inner side in a direction parallel to the optical axis of the lens from the lens end 21. The penetration was within the non-optical effective region.

It was confirmed that, by the penetration amounts d, g, and f, when a load of 100 g is applied in the direction of the optical axis from the lens surface, the undercut section does not break, as a result of which the holder and lens are strong enough and, thus, are kept integrated with each other without the holder falling off from the lens. Therefore, it was found that, by causing the inner peripheral surface 114 of the holder to penetrate the lens by an amount greater than or equal to 0.038 mm towards the inner side of the lens from an intersection line of the inner peripheral surface 114 of the holder and the lens surface, the holder and the lens are strong enough and, thus, are kept integrated with each other.

Next, the method of manufacturing the optical part (the lens with the holder) manufactured in the embodiment is described.

Figure 7A:
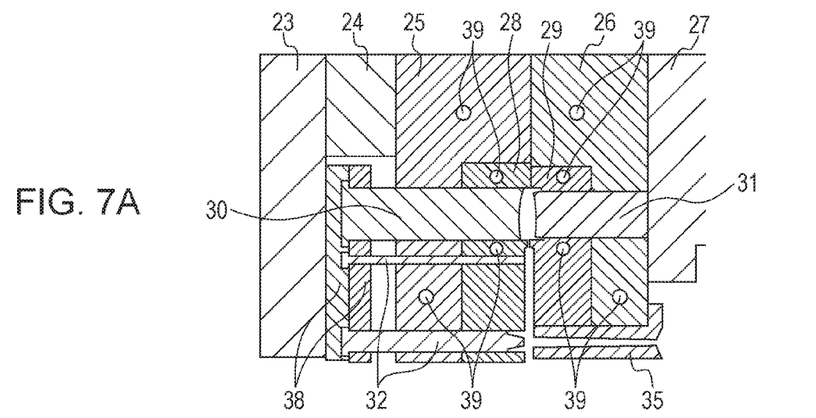
FIGS. 7A to 7C illustrate the exemplary embodiment.

In the optical part (the lens with the holder) according to the embodiment, with the holder being inserted in the mold, the lens was molded, and the back surface of the holder and part of the inner peripheral surface of the holder were brought into contact with the lens. Then, by causing the material of the lens to flow around part of the inner peripheral surface, the undercut section was formed to more firmly integrate the holder and the lens with each other. FIG. 7A is a sectional view of the mold that is used in molding the lens.

Reference numeral 23 denotes a movable mounting plate. Reference numeral 24 denotes a spacer block. Reference numeral 25 denotes a movable mold plate. Reference numeral 26 denotes a stationary mold plate. Reference numeral 27 denotes a stationary mounting plate. Reference numeral 30 denotes the mold part that transfers the objective-side lens surface. Reference numeral 31 denotes the mold part that transfers the eyepiece-side lens surface. Reference numeral 28 denotes the mold part that accommodates the mold part 30. Reference numeral 29 denotes the mold part that accommodates the mold part 31. Reference numeral 32 denotes an ejector pin. Reference numeral 38 denotes an ejector plate. Reference numeral 35 denotes a sprue bush. Reference numeral 39 denotes a water pipe that passes hot water therethrough for regulating the temperature of the mold.

Figure 7B:
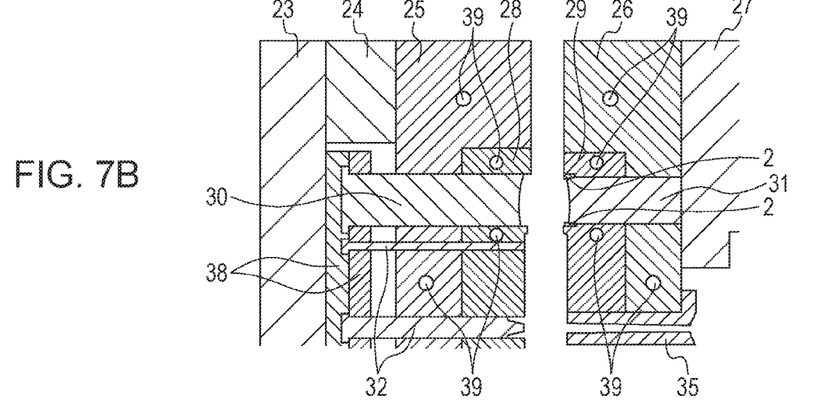

FIG. 7B is a sectional view showing a state in which the mold is open and the holder is inserted in the mold. When the mold had been open, the holder was inserted between the mold part 31 for transferring the eyepiece-side lens surface 3 and the mold part 29 for accommodating the mold part 31. Then, the outer peripheral surface and the front surface 31 of the holder were firmly brought into contact with the mold part 29 accommodating the mold part 31, and the mold was closed. Hot water whose temperature was 135° C. was passed through the water pipe 39.

In this state, a nozzle (not shown) of a plasticizing device of a molding machine was brought into contact with the sprue bush 35, and molten resin, used as a material of the lens, was injected. By this, the lens material flowed around part of the inner peripheral surface of the holder. In a pressure holding process, the molten resin, used as a material of the lens, was pushed against a lens transfer surface to transfer the lens surface. This was cooled for 170 seconds, and the mold was then open.

Figure 7C:
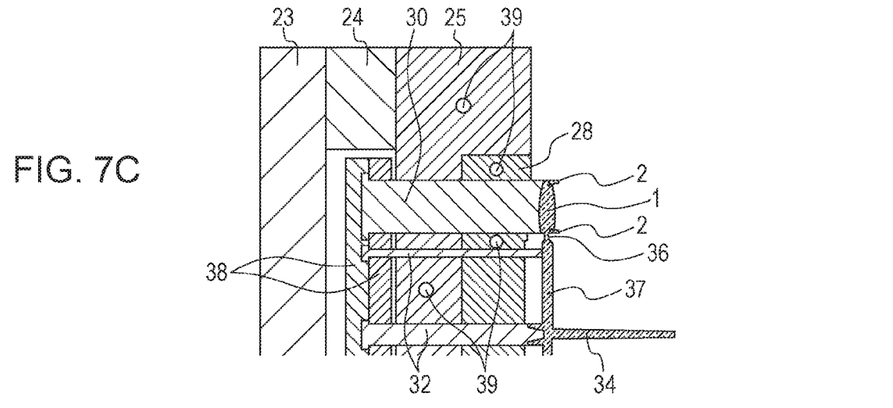

FIG. 7C is a sectional view showing a state in which an ejecting operation is completed after the opening of the mold. The ejector pin 32 and the mold part 30 that transfers the objective-side lens surface 4 moved forward, and the mold and a molded part were separated from each other. In this state, the molded part was released to the outside of the mold by a take-out device to obtain the lens with the holder.

As the penetration amount is reduced, the stability with which the lens is molded is increased. However, as the penetration amount is reduced, the adhesive strength is reduced. By considering the balance between the stability with which the lens is molded and the adhesive strength, it is possible to realize both high productivity and high adhesive strength.

In the examples, cyclo-olefin polymer was used as the lens material, and polycarbonate containing a glass filler was used as the material of the holder. The material of the lens and the material of the holder are not miscible with each other at an interface thereof. In a state in which they have been integrated with each other, air enters the interface. The combination of the material of the holder and the material of the lens is not limited to certain combinations. However, in this case, from the viewpoint of forming an integrated structure by forming an undercut, it is more effective to use a combination of the material of the lens and the material of the holder that are not miscible with each other.

In the examples, although the external shape of the lens and the external shape of the holder match, they need not match. Since restrictions are placed on structural designs and optical designs of surrounding parts or the like, the holder may be larger or smaller than the lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145133, filed Jul. 22, 2015, which is hereby incorporated by reference herein in its entirety.

What is claimed is:

1. An optical part comprising:
   a lens including an eyepiece-side lens surface, an objective-side lens surface opposing the eyepiece-side lens surface, and a side surface continuous between the eyepiece-side lens surface and the objective-side lens surface; and
   a cylindrical holder configured to fix the lens on the eyepiece-side lens surface side, the cylindrical holder including a front surface present on the eyepiece-side lens surface side, a back surface opposing the front surface and present on the objective-side lens surface side, an inner peripheral surface continuous between the front surface and the back surface, and an outer peripheral surface continuous between the front surface and the back surface and opposing the inner peripheral surface,
   wherein the inner peripheral surface of the cylindrical holder consists of a first region that is formed continuously from the front surface and is not in contact with the lens, and a second region that is formed continuously from the back surface and is in contact with the lens,
   wherein the second region is formed to approach an optical axis of the lens in a direction from the front surface to the back surface, and
   wherein the cylindrical holder is in contact with the lens only on the back surface of the cylindrical holder and in the second region.

2. The optical part according to claim 1,
   wherein the eyepiece-side lens surface, the second region, the back surface of the cylindrical holder, and the objective-side lens surface are arranged in this order in a direction of the optical axis of the lens.

3. The optical part according to claim 1,
   wherein the back surface intercepts light that is incident from the objective-side lens surface and that is reflected by the side surface.

4. The optical part according to claim 1,
wherein the cylindrical holder is made of polycarbonate, and the polycarbonate contains a glass filler in a range of 10 wt % to 20 wt % of the entire weight of the cylindrical holder.

5. A camera comprising:
the optical part according to claim 1.

6. The optical part according to claim 1, wherein the side surface of the lens and the outer peripheral surface of the cylindrical holder at least partially form a continuous surface.

* * * * *